(12) United States Patent
Hurt et al.

(10) Patent No.: US 11,955,998 B2
(45) Date of Patent: Apr. 9, 2024

(54) PROTECTIVE AND COOLING CASE FOR AN ELECTRONIC DEVICE

(71) Applicants: Alisha Hurt, Las Vegas, NV (US); Dwayne McLeod, Las Vegas, NV (US)

(72) Inventors: Alisha Hurt, Las Vegas, NV (US); Dwayne McLeod, Las Vegas, NV (US)

( * ) Notice: Subject to any disclaimer, the term of this patent is extended or adjusted under 35 U.S.C. 154(b) by 734 days.

(21) Appl. No.: 17/049,000

(22) PCT Filed: Jun. 17, 2019

(86) PCT No.: PCT/IB2019/055066
§ 371 (c)(1),
(2) Date: Oct. 19, 2020

(87) PCT Pub. No.: WO2019/202577
PCT Pub. Date: Oct. 24, 2019

(65) Prior Publication Data
US 2021/0242890 A1    Aug. 5, 2021

Related U.S. Application Data

(63) Continuation-in-part of application No. 16/364,302, filed on Mar. 26, 2019, now abandoned, and a continuation-in-part of application No. 29/704,248, filed on Sep. 3, 2019, now Pat. No. Des. 930,639.

(60) Provisional application No. 62/763,114, filed on Apr. 19, 2018.

(51) Int. Cl.
*G06F 1/16* (2006.01)
*H04B 1/036* (2006.01)
*H04B 1/3888* (2015.01)
*H05K 5/00* (2006.01)
*H05K 7/00* (2006.01)

(52) U.S. Cl.
CPC .......... *H04B 1/036* (2013.01); *H04B 1/3888* (2013.01)

(58) Field of Classification Search
CPC ..... H04B 1/036; H04B 1/3888; G06F 1/1626; G06F 1/1628; G06F 1/166
See application file for complete search history.

(56) References Cited

U.S. PATENT DOCUMENTS

| | | | |
|---|---|---|---|
| 9,608,686 B1 * | 3/2017 | Coulter | H04B 1/036 |
| 9,936,780 B2 * | 4/2018 | Tu | H04B 1/3888 |
| 2015/0060309 A1 * | 3/2015 | Sartee | A45C 11/00 |
| | | | 409/219 |

(Continued)

FOREIGN PATENT DOCUMENTS

| | | | |
|---|---|---|---|
| CN | 206629123 U | * | 11/2017 |
| CN | 206629123 U | | 11/2017 |

*Primary Examiner* — Anthony M Haughton (57) ABSTRACT

A protective and cooling case for an electronic device is able to reduce the temperature of the electronic device while protecting said electronic device. The protective and cooling case includes a case body, a securing mechanism, and at least one cooling module. The case body is a structure that is wrapped around the electronic device in order to protect the electronic device from shock forces when or if accidentally dropped. The case body can be any shape and size to protect various types of electronic devices such as, but not limited to, mobile phones or electronic tablets. The securing mechanism is a means to securely attach the at least one cooling module to the case body. The at least one cooling module is used to reduce the temperature of the electronic device.

18 Claims, 13 Drawing Sheets

(56) References Cited

U.S. PATENT DOCUMENTS

2017/0099922 A1* 4/2017 Guerdrum ............... H04M 1/04
2021/0307185 A1* 9/2021 Hong ................... H05K 5/0226
2021/0355986 A1* 11/2021 Oldani ................ H04M 1/0216

* cited by examiner

PROTECTIVE AND COOLING CASE FOR AN ELECTRONIC DEVICE

The current application is a 371 of international Patent Cooperation Treaty (PCT) application PCT/IB2019/055066 filed on Jun. 17, 2019. The PCT application PCT/IB2019/055066 claims a priority to a U.S. non-provisional application Ser. No. 16/364,302 filed on Mar. 26, 2019. The U.S. non-provisional application Ser. No. 16/364,302 claims a priority to a U.S. non-provisional application Ser. No. 15/957,635 filed on Apr. 19, 2018. The U.S. non-provisional application Ser. No. 15/957,635 was converted into a U.S. provisional application Ser. No. 62/763,114 on Jul. 25, 2018.

The current application also claims priority to the U.S. design application Ser. No. 29/704,248 filed on Sep. 3, 2019.

FIELD OF THE INVENTION

The present invention relates generally to protective cases for electronic devices. More specifically, the present invention is a protective and cooling case for an electronic device. The present invention includes a cooling module in order to reduce the temperature of an electronic device.

BACKGROUND OF THE INVENTION

Electronic devices are becoming an important part of our lives. With electronic devices increasingly adding processing power and packing large batteries with fast-charging technology, a heavy workload can take a toll on electronic devices. An example of such behavior is the overheating of the electronic device, and more specifically, the electronic devices' power source. Processors reaching up to speeds of at least one gigahertz and random-access memory (RAM) of 8 or more gigabytes make a lot of electronic devices very powerful. With so much power, more heat is generated and an electronic device such as, but not limited to, a smartphone, tablet personal computer, gaming phone, laptop may not effectively release heat. Too much overheating can eventually lead to an individual owning an expensive paperweight. An overheated electronic device usually runs slower, drains the battery fast, shortens its life span, or even causes the electronic device to explode. With the advancement of technology in electronic devices (e.g. cell phones, tablets, gaming phones, laptops and other types of similar devices) becoming more popular and generally becoming an expensive investment the owner wants to protect, the integration of these innovations, along with the advancement of features and combining elements; in and on electronic devices, has amounted to the production of very expensive and powerful electronic devices that let the user enjoy more than one application, game, or stream.

However, the integration of these innovations, into electronic devices, has amounted to the production of heat becoming trapped in an electronic devices' housing unit or by heat becoming trapped while in a protection case or cover. This can cause overheating to the screen, battery damage, battery drainage, or catching fire, which can be very expensive to replace or fix. Accessories, in the form of cases and/or covers, have been produced to keep electronic devices safe from unexpected incidents, but existing cases and/or covers only provide this single function of providing only outer protection, without providing a solution to the overheating issue. Some cases on the market are being made to help extend battery life and protection from outside elements or mishaps, however, they do not protect the electronic device if and/or when it is overheating. While a case with an extra battery life charging feature can help extend the battery life of the electronic device and protect from a mishap or an elemental occurrence, the electronic device can still become damaged or inoperable due to overheating. Additionally, the usage of multiple applications, functions, events, and weather increases the chances of an electronic devices' battery and/or screen to be overworked which can cause overheating. All types of electronic devices such as, but not limited to, cellphones, tablets, and laptops have similar problems, to where the case does not adequately protect the electronic device when the electronic device is overworked, and excessive heat is trapped. Still furthermore, more advanced electronic devices that have larger screens, more storage space, multiple applications, and more functions, can easily be overheated and damaged which is undesirable.

SUMMARY OF THE INVENTION

An electronic device case and cooling module for providing both a protective casing on the outside for an electronic device as well as the inside; which includes an integrated or attached cooling module for cooling of the electronic device and the electronic devices' battery and/or screen therein. The case body is defined by a front piece and a back piece, which are configured to be attached to each other through the operation of a plurality of fasteners to form an enclosure in which an electronic device is placed and secured. The cooling module enables the electronic device and battery to stay at a cool temperature to generate cooling of the electronic device disposed in the protective case. In this regard, the cooling module prevents overheating, which means for longer use, and all-around protection of the electronic device. The cooling effect, generated by the cooling module, is achieved through; plastic, metal and/or copper layer, which encases a cooling material, once the cooling module is placed into an environment, in which it can freeze or be kept cool, you can slide, attach or mount the cooling module to the inside of the back piece of the protective case or insert through the opening from the rear end of the case, which aligns with the electronic devices' battery. The cooling module provides a means for providing cooling, indirectly, to an encased electronic device and battery.

Thus, other than the protective case, encasing the electronic device, the exterior of the integrated electronic device case and cooling module are substantially indistinguishable from many protective cases in the prior art. It is an objective of the present invention to provide an electronic device case and cooling module, which enables the electronic device to be cooled without overheating in all its uses and elements; gaming, weather, mishaps, applications, or connection to an electrical outlet while charging. It is another objective of the present invention to provide an electronic device case to provide protection for the electronic device from physical damage as well. It is yet another objective of the present invention to provide an integrated electronic device case and cooling module to provide long-lasting performance and increase the life of the electronic device.

DETAIL DESCRIPTIONS OF THE INVENTION

All illustrations of the drawings are for the purpose of describing selected versions of the present invention and are not intended to limit the scope of the present invention.

Figure 1:
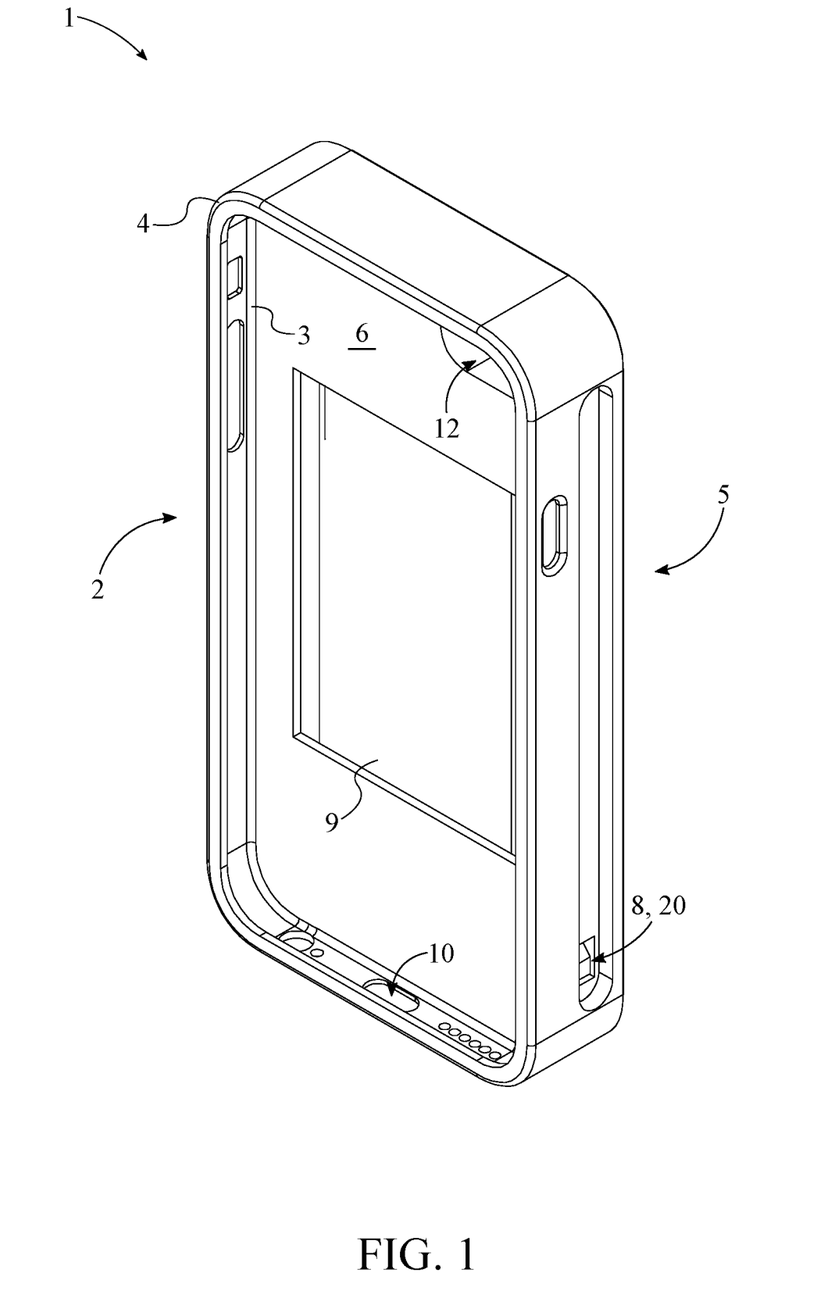
FIG. 1 is a front perspective view of the first embodiment of the present invention.

In reference to FIGS. 1 through 13, the present invention is a protective and cooling case for an electronic device. In more detail, the present invention is able to reduce the temperature of the electronic device and provide protection for said electronic device. With reference to FIG. 1, the present invention comprises a case body 1, a securing mechanism 8, and at least one cooling module 9. The case body 1 is a structure that is wrapped around the electronic device in order to protect the electronic device from shock forces when or if accidentally dropped. Further, the case body 1 may be composed of any material that is able to absorb shocks in order to properly protect the electronic device. The case body 1 can be any shape and size to protect various types of electronic devices such as, but not limited to, mobile phones or electronic tablets. The securing mechanism 8 is a means to securely attach the at least one cooling module 9 to the case body 1. Various methods may be used to securely attach the at least one cooling module 9 to the case body 1 and a few preferred methods will be further detailed. The at least one cooling module 9 is used to reduce the temperature of the electronic device. Further, the at least one cooling module 9 is able to absorb and/or dissipate heat from the electronic device.

Figure 2:
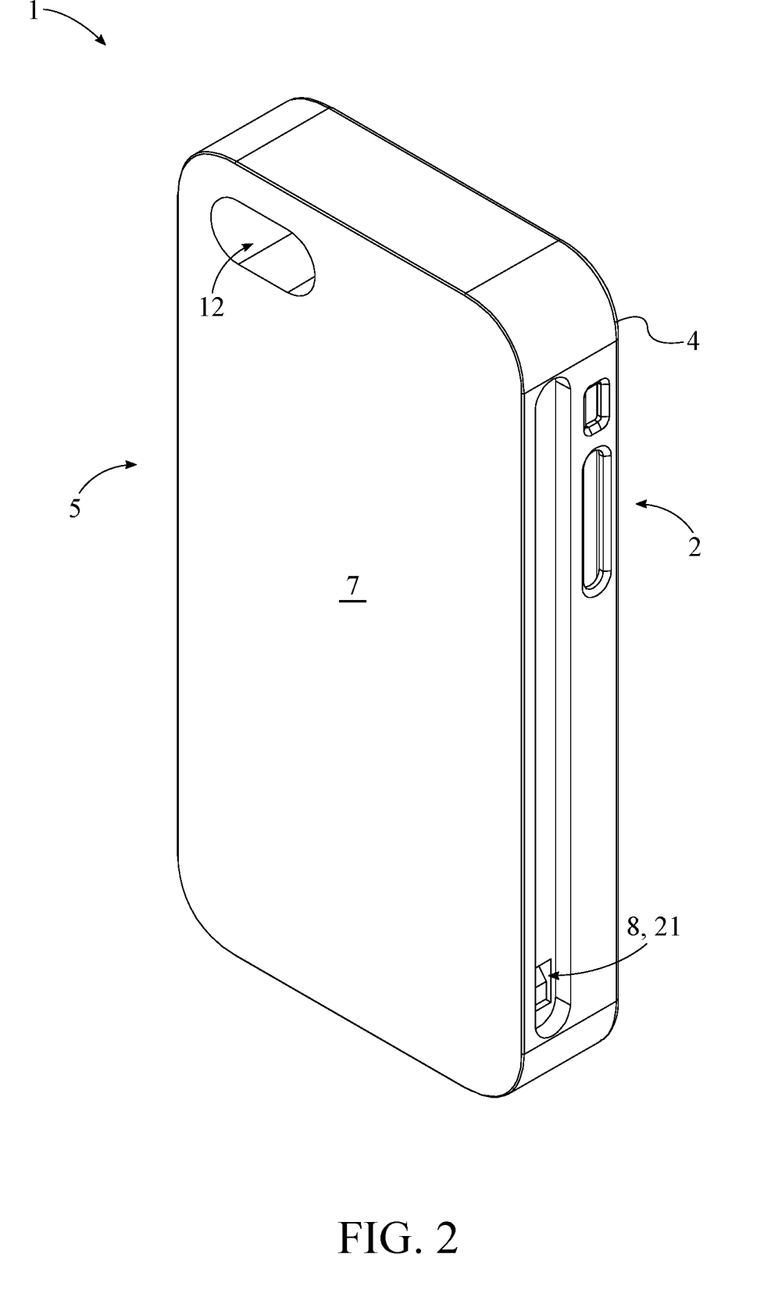
FIG. 2 is a rear perspective view of the first embodiment of the present invention.
Figure 3:
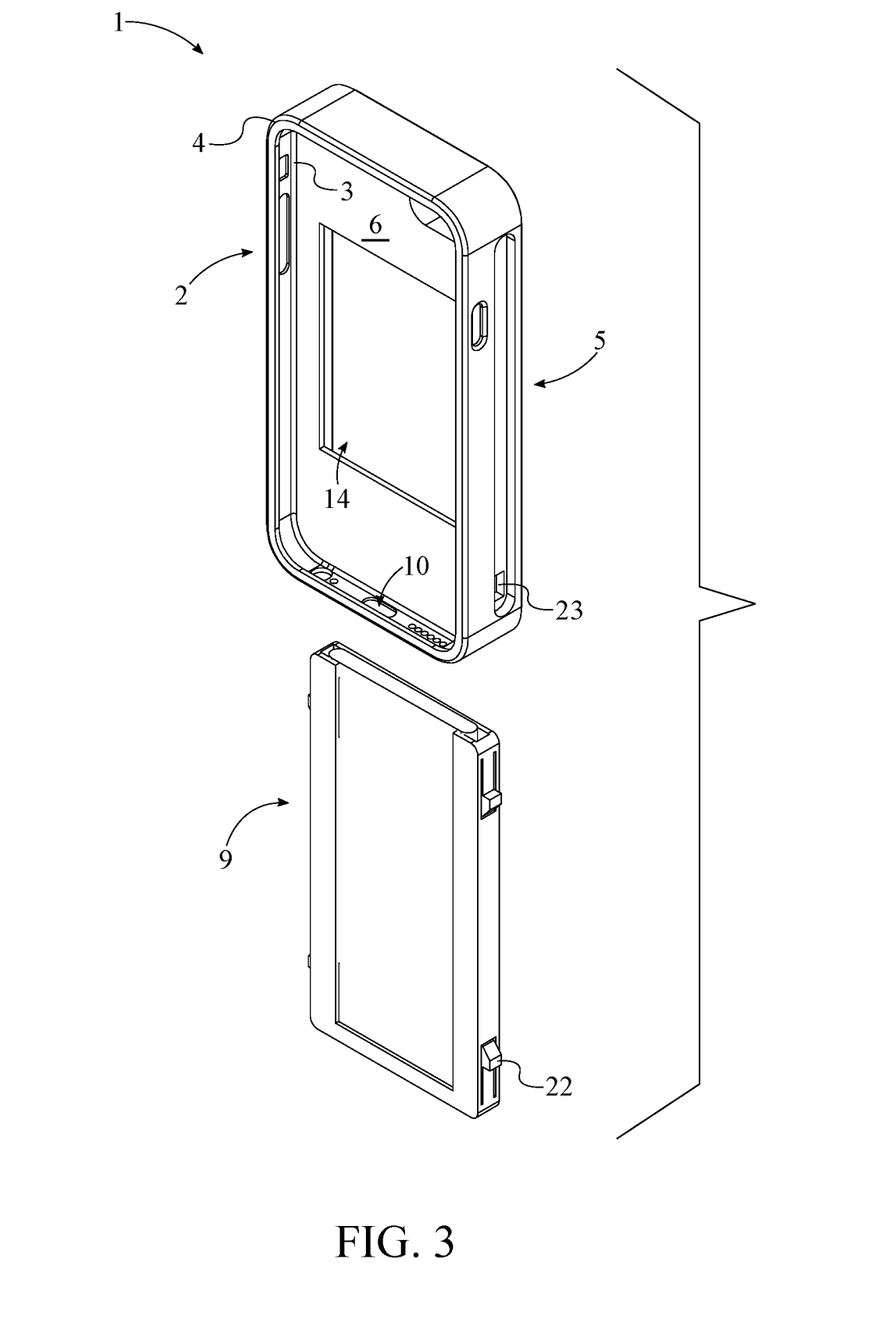
FIG. 3 is an exploded view of FIG. 1.
Figure 4:
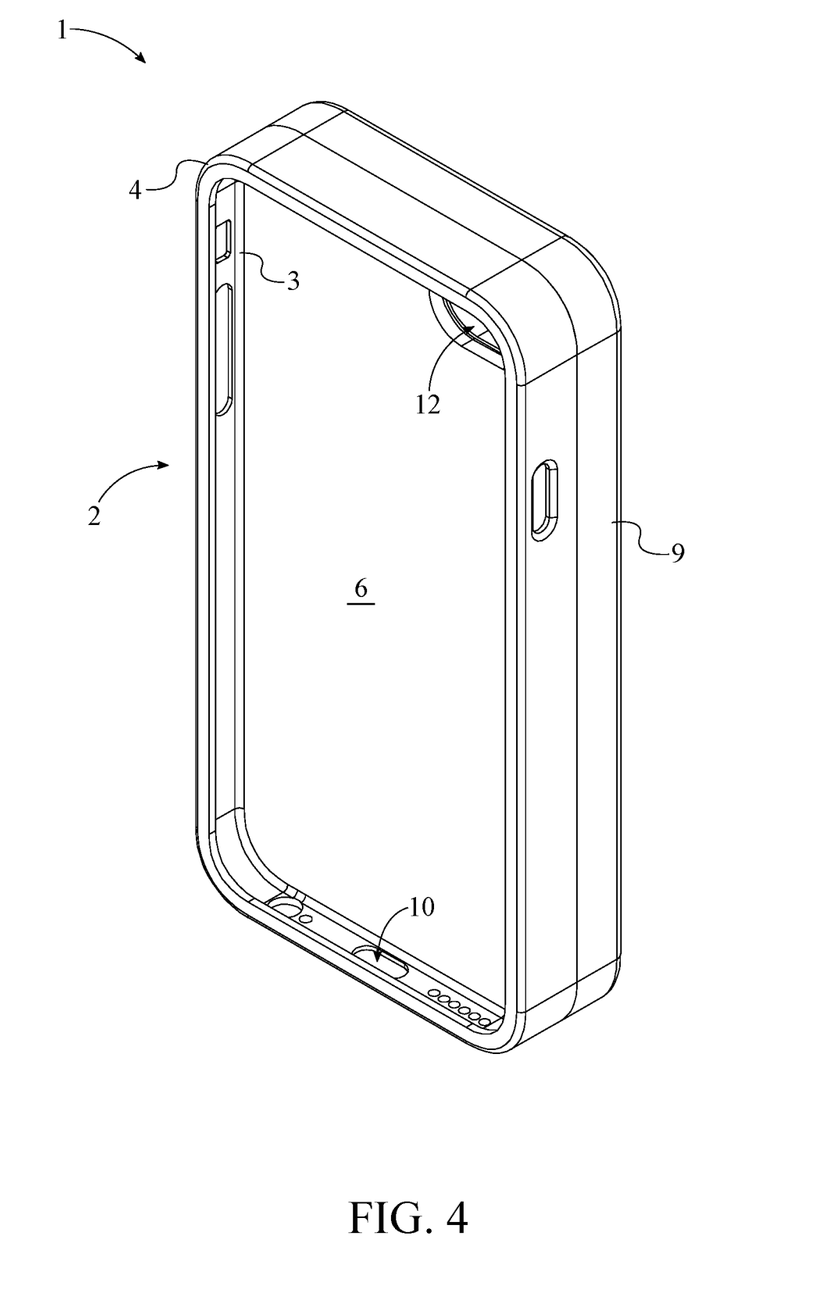
FIG. 4 is a front perspective view of the second embodiment of the present invention.
Figure 5:
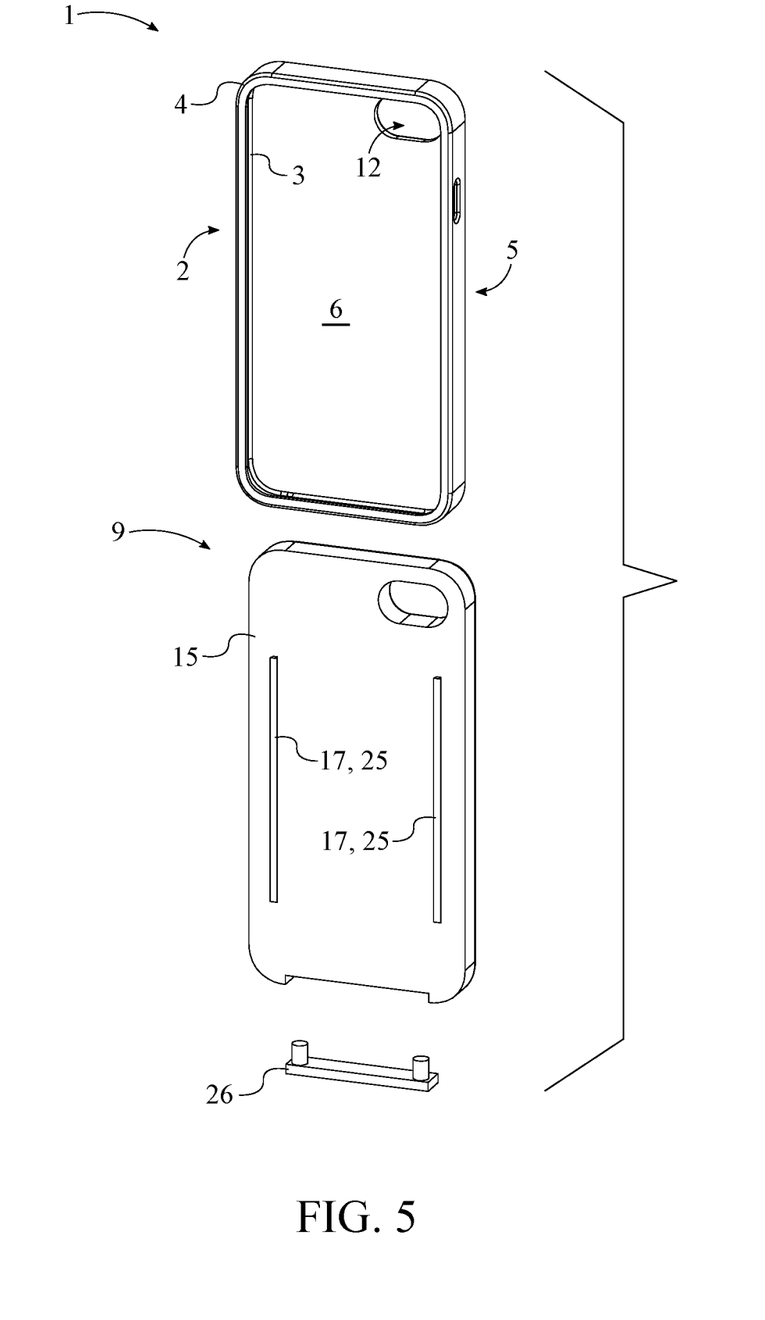
FIG. 5 is an exploded view of FIG. 4.
Figure 6:
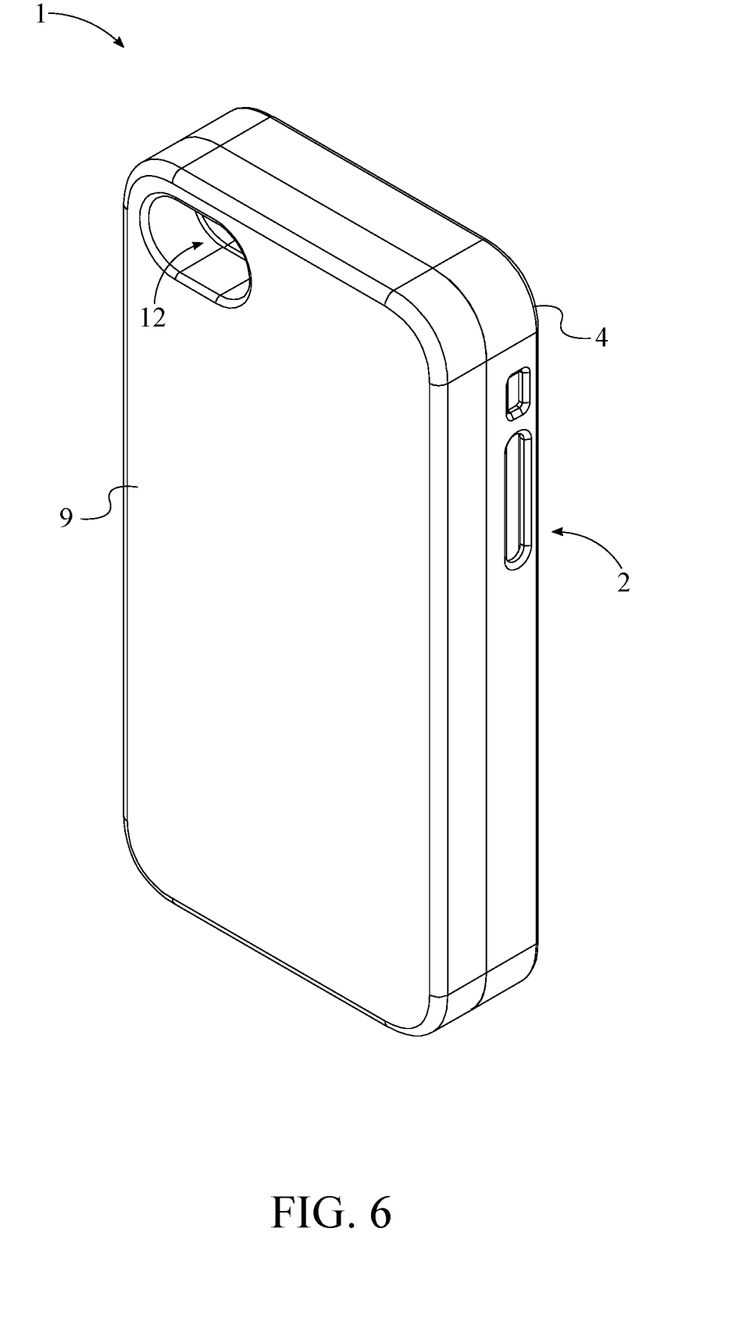
FIG. 6 is a rear perspective view of the second embodiment of the present invention.
Figure 7:
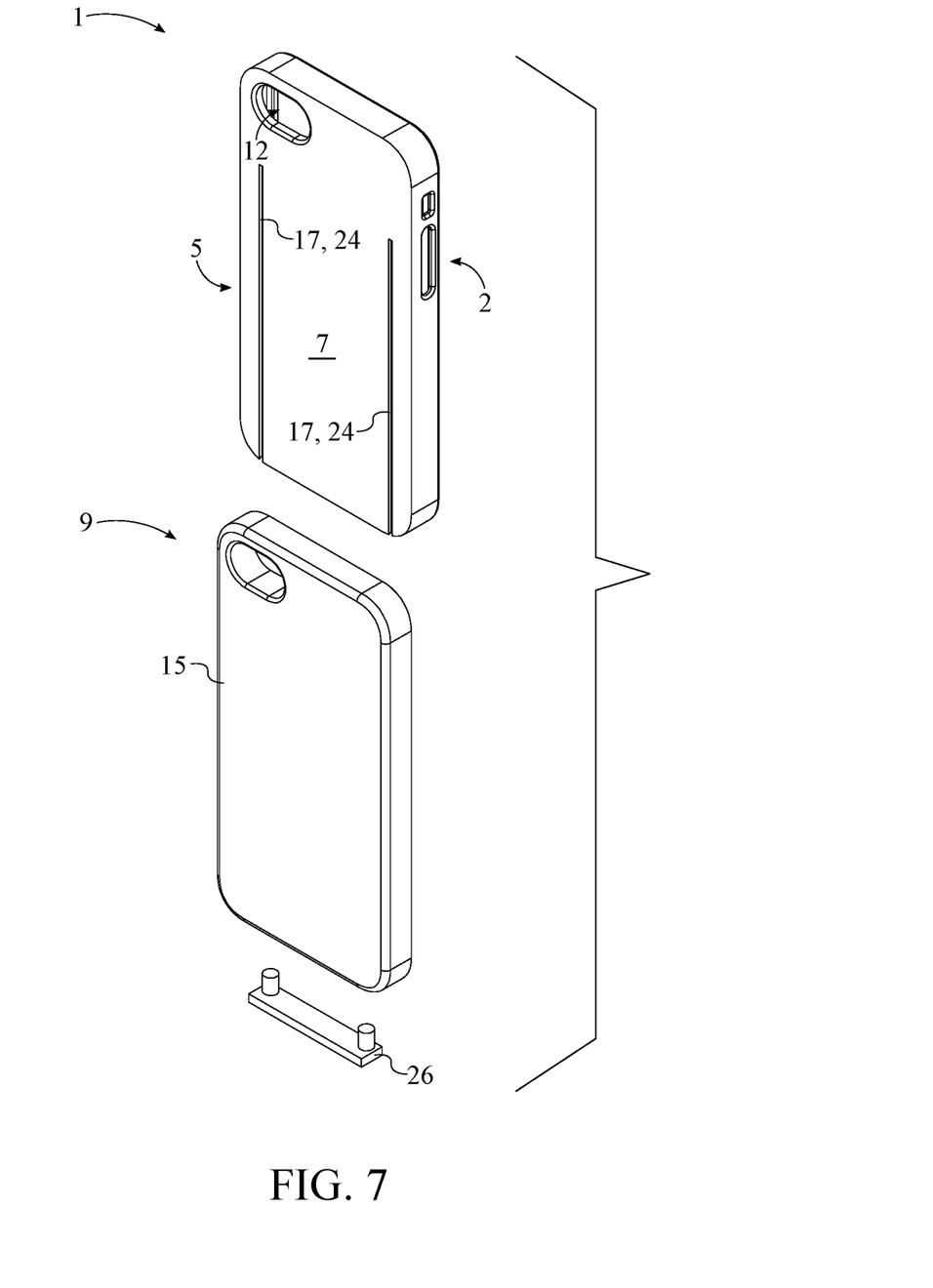
FIG. 7 is an exploded view of FIG. 6.
Figure 8:
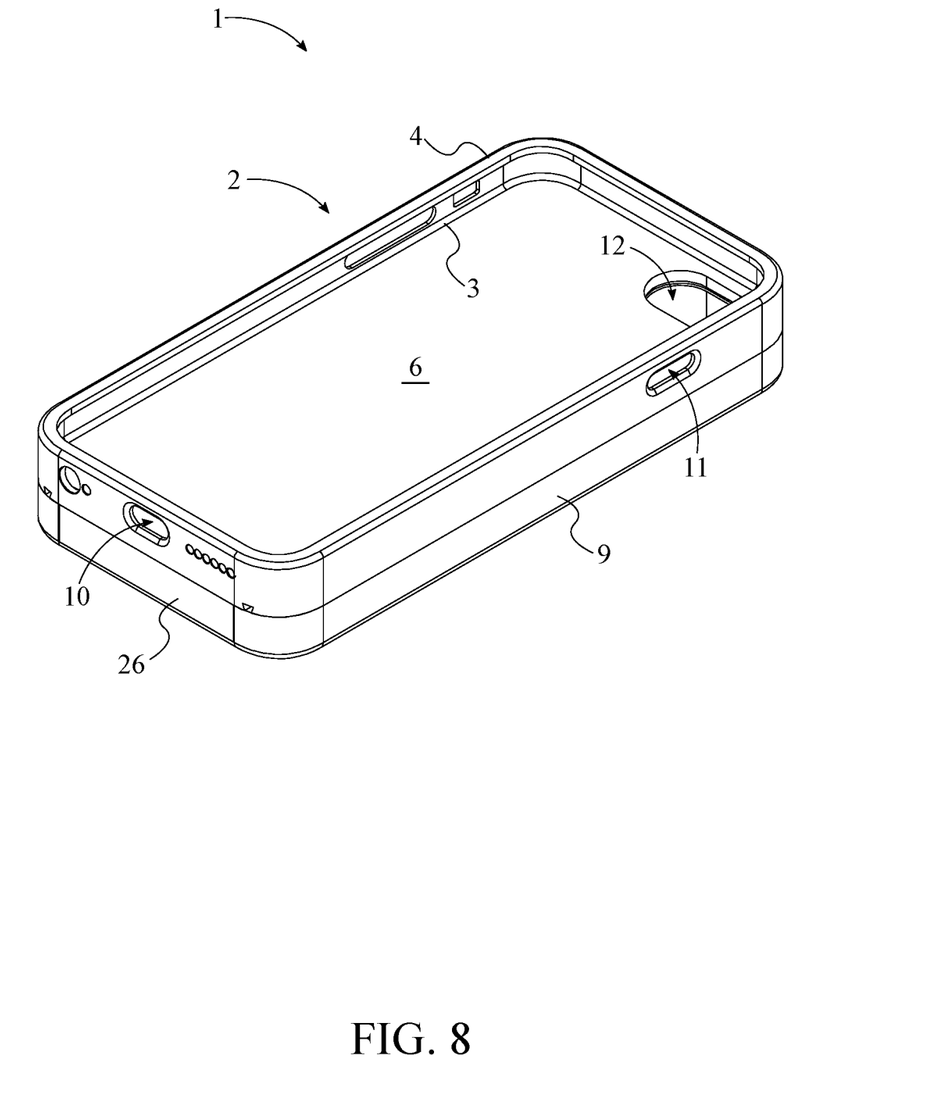
FIG. 8 is a top perspective view of the second embodiment of the present invention.

The general configuration of the aforementioned components allows the present invention to effectively reduce the temperature of the electronic device while protecting said electronic device. With reference to FIGS. 1 and 2, the case body 1 comprises a lateral frame 2 and a base platform 5. The lateral frame 2 is used to border the lateral surface of the electronic device. The base platform 5 is used to support and conceal the rear face of the electronic device, while leaving the front face of the electronic device exposed as an interface for a user. The lateral frame 2 comprises a proximal rim 3 and a distal rim 4. The base platform 5 comprises a proximal face 6 and a distal face 7. The proximal rim 3 is perimetrically connected to the proximal face 6 in order to form the case body 1. The at least one cooling module 9 is mounted into the base platform 5 by the securing mechanism 8. This arrangement allows the at least one cooling module to physically contact the rear face of the electronic device, where the power source is commonly located, in order to effectively reduce the temperature of the power source and therefore reduce the temperature of the electronic device.

With reference to FIG. 1, the present invention may further comprise at least one port-access opening 10. The at least one port-access opening 10 is a cutout which allows a user to access the ports of the electronic device when the present invention is wrapped around the electronic device. In order for the at least one port-access opening 10 to allow easy access to the ports of the electronic device, the at least one port-access opening 10 traverses through the lateral frame 2.

Figure 11:
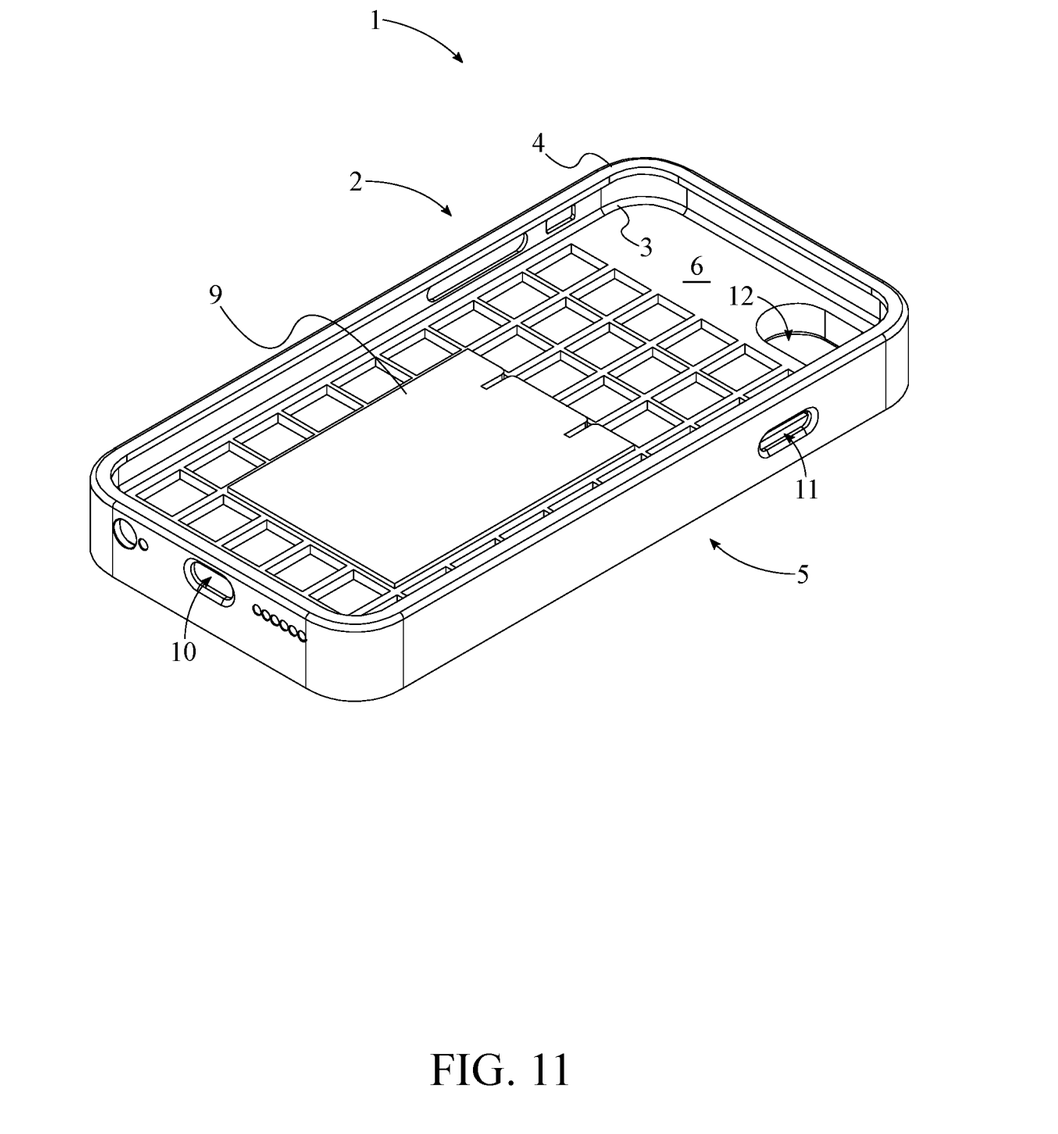
FIG. 11 is a top perspective view of the third embodiment of the present invention.

With reference to FIG. 11, the present invention may further comprise at least one button extension 11. The at least button extension 11 may be a cutout or movable and deformable section of the case body which allows a user to press the buttons of an electronic device through the case body 1. In order for user to be able to press buttons on the electronic device through the at least one button extension 11, the at least one button extension 11 is integrated into the lateral frame 2.

With reference to FIG. 1, the present invention may further comprise at least one camera opening 12. The at least one camera opening 12 is a cutout that exposes the camera of the electronic device, if the electronic device includes a camera on its rear face, in order for the user to use the camera when the present invention is wrapped around the electronic device. In order for the at least one camera opening 12 to expose the camera on the rear face of the electronic device, the at least one camera opening 12 traverses through the base platform 5.

Figure 13:
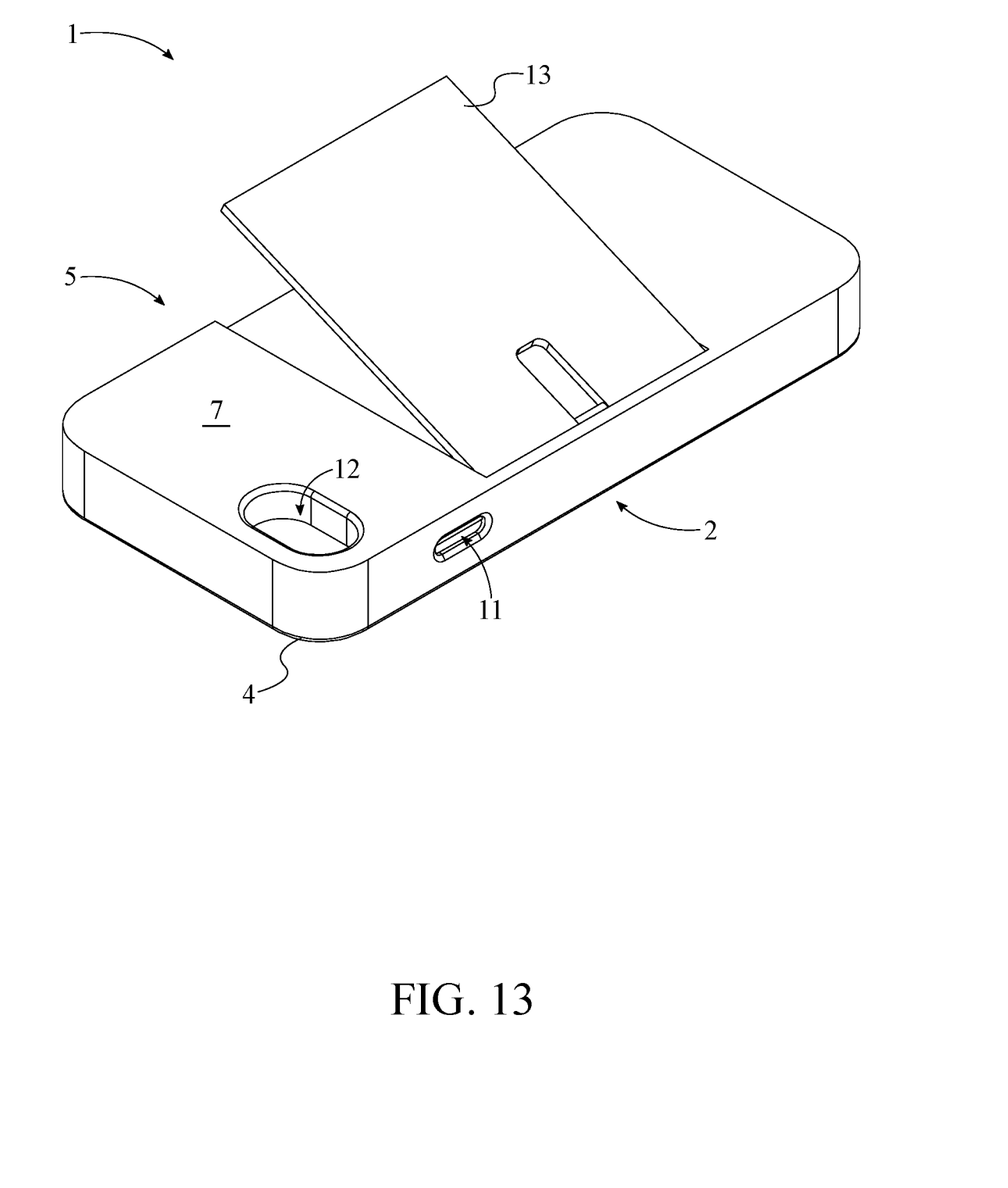
FIG. 13 is a bottom perspective of the present invention.

With reference to FIG. 13, the present invention may further comprise a kickstand 13. The kickstand 13 allows the user to support the electronic device upright or at an angle for a comfortable viewing experience. In order for the kickstand 13 to properly support the electronic device, the kickstand 13 is hingedly connected to the distal face 7.

As mentioned previously, the at least one cooling module 9 is used to reduce the temperature of the electronic device. In a first embodiment of the present invention and with reference to FIGS. 11 and 12, the at least one cooling module 9 may be a cooling pack. Further, the at least one cooling module 9, in this embodiment, is composed of a cooling component such as, but not limited to, cooling gel in a tandem arrangement. The cooling pack absorbs heat from the electronic device in order to reduce the temperature of the electronic device. The cooling pack can be chilled and/or cooled by being placed inside a low-temperature environment such as, but not limited to, a refrigerator, a freezer, or on ice inside a cooler.

Figure 9:
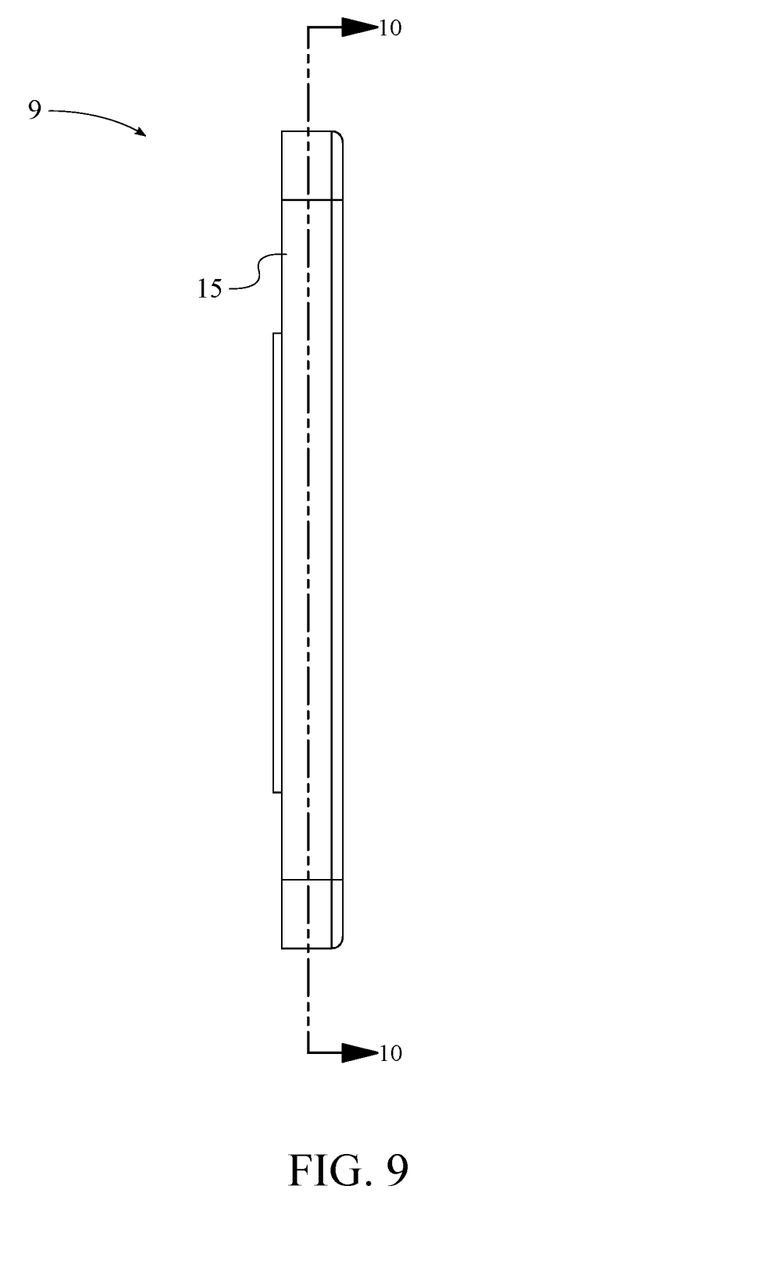
FIG. 9 is a side view of the cooling module.
Figure 10:
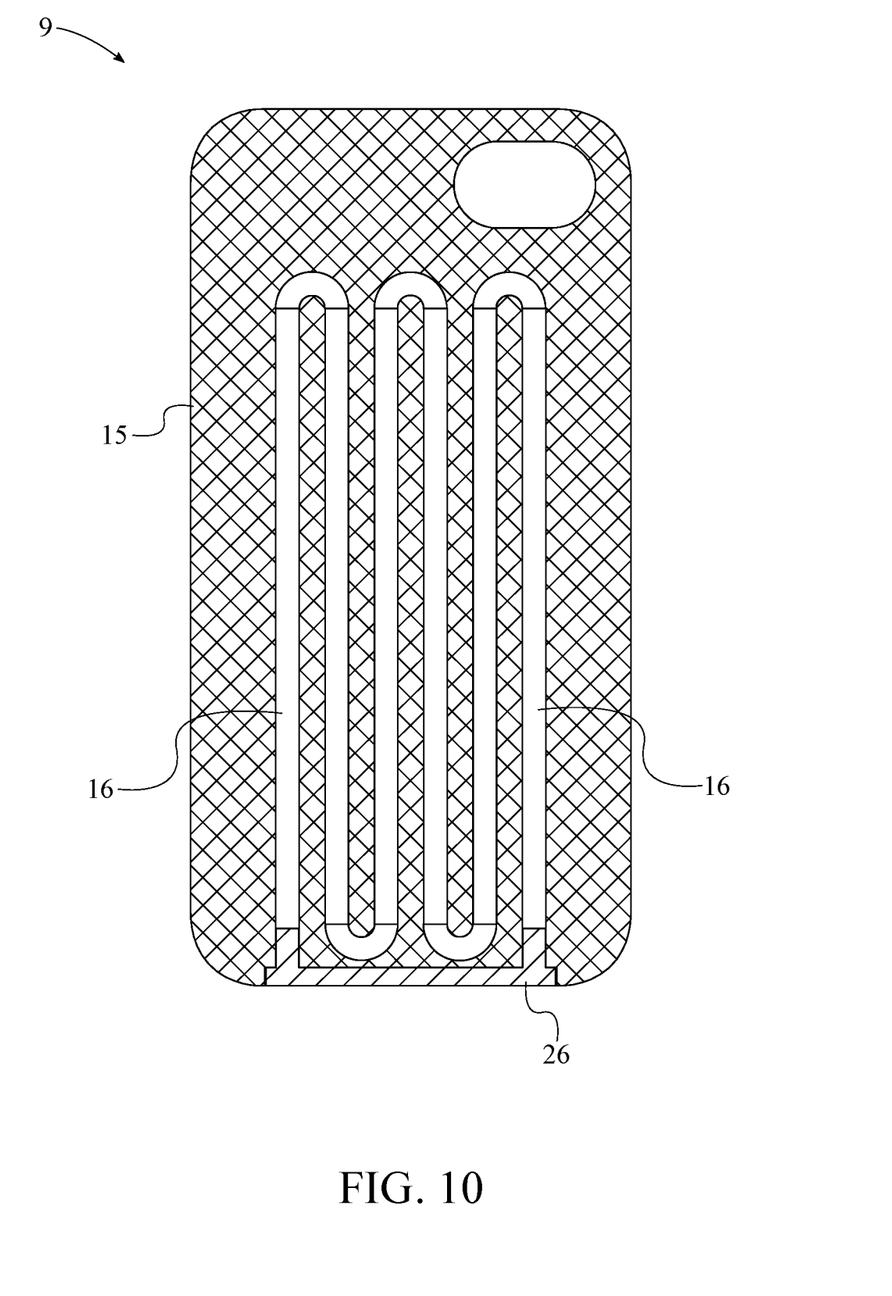
FIG. 10 is a cross-sectional view along line 10-10 from FIG. 9.

In a second embodiment of the present invention and with reference to FIGS. 9 and 10, the at least one cooling module 9 may be a heatsink device. In further detail, the at least one cooling module comprises a thermally-conductive housing 15, a plurality of heat-retaining pipes 16, and a plug 26. The thermally-conductive housing 15 is used to conceal and protect the plurality of heat-retaining pipes 16. In order to accomplish this, the plurality of heat-retaining pipes 16 is positioned within and throughout the thermally-conductive housing 15. The plurality of heat-retaining pipes 16 is preferably a set of tubes filled with a heat-absorbing medium such as, but not limited to, a cooling liquid. The plug 26 is releasably mounted into the thermally-conductive housing 15 and is in fluid communication with the plurality of heat-retaining pipes 16. This arrangement allows the plug 26 to seal the plurality of heat-training pipes in order to prevent any leakage. Further, this arrangement allows the user to remove the plug 26 in order to replace or refill the heat-absorbing medium within the plurality of heat-retaining pipes 16.

As mentioned previously, the securing mechanism 8 is used to mount the at least one cooling module 9 into the base platform 5. In a first embodiment of the present invention and with reference to FIGS. 1 through 3, the securing mechanism 8 comprises at least one receptacle 14. The at least one receptacle 14 is a recessed area within the base platform 5 that is used to receive the cooling module. The at least one receptacle 14 traverses into the base platform 5 and is positioned between the proximal face 6 and the distal face 7. This arrangement properly positions the at least one receptacle 14 in order to receive the at least one cooling module 9. The at least one cooling module 9 is positioned within the at least one receptacle 14. This arrangement allows at least one cooling module 9 to effectively reduce the temperature of the electronic device. The securing mechanism 8 further comprises a first slide-release assembly 20 and a second slide-release assembly 21. The first slide-release assembly 20 and the second slide-release assembly 21 are used to secure the at least cooling module within the at least one receptacle 14. The first slide-release assembly 20 and the second slide-release assembly 21 each comprise at least one proximal interlocking feature 22 and at least one distal interlocking feature 23. The at least one proximal interlocking feature 22 is preferably a hook. The at least one distal interlocking feature 23 is preferably a catch receptacle. The first slide-release assembly 20 and the second slide-release assembly 21 are positioned opposite to each other about the at least one cooling module 9. This arrangement allows the at least one cooling module 9 to be evenly secured within the at least one receptacle 14. The at least one proximal interlocking feature 22 is integrated into the at least one cooling module 9, and the at least one distal interlocking feature 23 is integrated into the base platform 5. This arrangement allows the at least one cooling module 9 to be engaged into the base platform 5. Further, the at least one proximal interlocking feature 22 and the at least one distal interlocking feature 23 are engaged to each other. This arrangement fully secures the at least one cooling module 9 within the at least one receptacle 14.

In a second embodiment of the present invention and with reference to FIGS. 4 through 8, the securing mechanism 8 comprises a plurality of fasteners 17. The plurality of fasteners 17 is a set of fastening features used to securely attach the at least one cooling module 9 to the case body 1. The at least one cooling module 9 is attached onto the distal face 7 by the plurality of fasteners 17. In further detail, the plurality of fasteners 17 is used to releasably secure the at least one cooling module 9 against the case body 1. Further, each of the plurality of fasteners comprises a track 24 and a rail 25. The track 24 is a recessed space used to slidably receive the rail 25. The track 24 is integrated into the distal face 7, and the rail 25 is connected onto the at least one cooling module 9. This arrangement allows the at least one cooling module 9 to be secured to the case body 1. Further, the rail 25 is slidably engaged along the track 24. This arrangement fully secures the at least one cooling module 9 to the case body 1 and allows the user to remove the at least one cooling module 9 from the case body 1 when desired.

Figure 12:
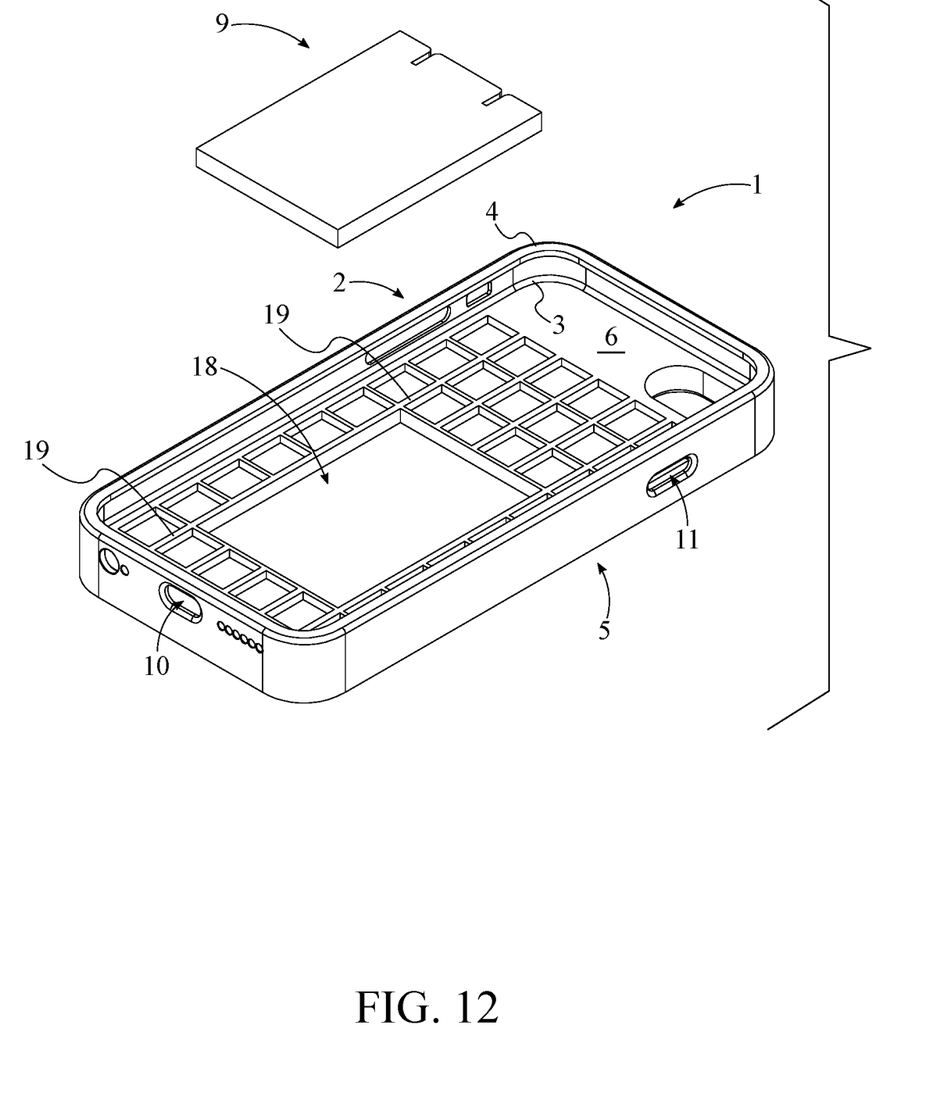
FIG. 12 is an exploded view of FIG. 11.

In a third embodiment of the present invention and with reference to FIGS. 11 and 12, the securing mechanism 8 comprises at least one recessed space 18. The at least one recessed space 28 is an area shaped and sized to receive the cooling module. The at least one recessed space 18 traverses into the base platform 5 from the proximal face 6. This arrangement properly positions the at least one recessed space 18 to receive the at least one cooling module 9 where the at least one cooling module 9 can effectively reduce the temperature of the electronic device. The at least one cooling module 9 is situated within the at least one recessed space 18. In further detail, the at least one cooling module 9 is positioned in order to enclose the cooling module 9 between the rear face of the electronic device and the at least one recessed space 18. The securing mechanism 8 may further comprise a plurality of structural ribs 19. The plurality of structural ribs 19 is used to support the at least one recessed space 18 and to reduce material of the base platform 5 in order to reduce the weight of the case body 1. The plurality of structural ribs 19 is integrated into the proximal face 6 and is distributed around the at least one recessed space 18 in order to properly support the at least one recessed space 18, and to effectively reduce the weight of the case body 1.

In another embodiment of the present invention, the at least one cooling module 9 is embedded into the base platform 5 by the securing mechanism 8. Therefore, the at least one cooling module 9 is permanently affixed within the case body 1. In this embodiment, if the at least one cooling module 9 is a cooling pack, the at least one cooling module 9 may be chilled or cooled by placing the case body 1 into a refrigerator or freezer.

The present invention may further comprise a cooling module holder. The cooling module holder is a storage device for the at least one cooling module 9 in order to keep the at least one cooling module 9 at a low temperature when not in use. Further, a plurality of slots traverses into the cooling module holder which allows the cooling module holder to receive that at least one cooling module 9. Further, a lid may be mounted adjacent to a slot opening of each of the plurality of slots in order to conceal the at least one cooling module 9 when stored inside the cooling module holder.

Although the invention has been explained in relation to its preferred embodiment, it is to be understood that many other possible modifications and variations can be made without departing from the spirit and scope of the invention as hereinafter claimed.

What is claimed is:

1. A protective and cooling case for an electronic device comprising:
    a case body;
    a securing mechanism;
    at least one cooling module;
    at least one button extension;
    a kickstand;
    the case body comprising a lateral frame and a base platform;
    the lateral frame comprising a proximal rim and a distal rim;
    the base platform comprising a proximal face and a distal face;
    the securing mechanism comprising at least one receptacle, a first slide-release assembly, and a second slide-release assembly;
    the first slide-release assembly and the second slide-release assembly each comprising at least one proximal interlocking feature and at least one distal interlocking feature;
    the base platform being a planar body;
    the proximal face and the distal face being flat coextensive surfaces;
    the proximal face and the distal face being positioned parallel and offset from each other;
    the proximal rim being perimetrically connected to the proximal face;
    the at least one cooling module being mounted into the base platform by the securing mechanism;
    the at least one button extension being integrated into the lateral frame;

the kickstand being hingedly connected to the distal face;
the at least one receptacle traversing into the base platform;
the at least one receptacle being positioned between the proximal face and the distal face;
the at least one cooling module being positioned within the at least one receptacle;
the first slide-release assembly and the second slide-release assembly being positioned opposite to each other about the at least one cooling module;
the at least one proximal interlocking feature being a hook;
the at least one distal interlocking feature being a catch receptacle;
the at least one proximal interlocking feature being integrated into the at least one cooling module;
the at least one distal interlocking feature being integrated into the base platform; and
the at least one proximal interlocking feature and the at least distal interlocking feature being engaged to each other.

2. The protective and cooling case for an electronic device as claimed in claim 1 comprising:
at least one port-access opening; and
the at least one port-access opening traversing through the lateral frame.

3. The protective and cooling case for an electronic device as claimed in claim 1 comprising:
at least one camera opening; and
the at least one camera opening traversing through the base platform.

4. The protective and cooling case for an electronic device as claimed in claim 1, wherein the at least one cooling module is a cooling pack.

5. The protective and cooling case for an electronic device as claimed in claim 1, wherein the at least one cooling module is a heatsink device.

6. The protective and cooling case for an electronic device as claimed in claim 5 comprising:
the at least one cooling module comprising a thermally-conductive housing, a plurality of heat-retaining pipes, and a plug;
the plurality of heat-retaining pipes being positioned within and throughout the thermally-conductive housing;
the plug being releasably mounted into the thermally-conductive housing; and
the plug being in fluid communication with the plurality of heat-retaining pipes.

7. A protective and cooling case for an electronic device comprising:
a case body;
a securing mechanism;
at least one cooling module;
at least one button extension;
a kickstand;
the case body comprising a lateral frame and a base platform;
the lateral frame comprising a proximal rim and a distal rim;
the base platform comprising a proximal face and a distal face;
the securing mechanism comprising a plurality of fasteners;
each of the plurality of fasteners comprising a track and a rail;
the base platform being a planar body;
the proximal face and the distal face being flat coextensive surfaces;
the proximal face and the distal face being positioned parallel and offset from each other;
the proximal rim being perimetrically connected to the proximal face;
the at least one cooling module being mounted into the base platform by the securing mechanism;
the at least one button extension being integrated into the lateral frame;
the kickstand being hingedly connected to the distal face;
the at least one receptacle traversing into the base platform;
the cooling module being attached onto the distal face by the plurality of fasteners;
the track being integrated into the distal face along an entire length of the distal face;
the rail being connected onto the at least one cooling module along an entire length of the cooling module; and
the rail being slidably engaged along the track.

8. The protective and cooling case for an electronic device as claimed in claim 7 comprising:
at least one port-access opening; and
the at least one port-access opening traversing through the lateral frame.

9. The protective and cooling case for an electronic device as claimed in claim 7 comprising:
at least one camera opening; and
the at least one camera opening traversing through the base platform.

10. The protective and cooling case for an electronic device as claimed in claim 7, wherein the at least one cooling module is a cooling pack.

11. The protective and cooling case for an electronic device as claimed in claim 7, wherein the at least one cooling module is a heatsink device.

12. The protective and cooling case for an electronic device as claimed in claim 11 comprising:
the at least one cooling module comprising a thermally-conductive housing, a plurality of heat-retaining pipes, and a plug;
the plurality of heat-retaining pipes being positioned within and throughout the thermally-conductive housing;
the plug being releasably mounted into the thermally-conductive housing; and
the plug being in fluid communication with the plurality of heat-retaining pipes.

13. A protective and cooling case for an electronic device comprising:
a case body;
a securing mechanism;
at least one cooling module;
at least one button extension;
a kickstand;
the case body comprising a lateral frame and a base platform;
the lateral frame comprising a proximal rim and a distal rim;
the base platform comprising a proximal face and a distal face;
the securing mechanism comprising at least one recessed space and a plurality of structural ribs;
the base platform being a planar body;
the proximal face and the distal face being flat coextensive surfaces;

the proximal face and the distal face being positioned parallel and offset from each other;

the proximal rim being perimetrically connected to the proximal face;

the at least one cooling module being mounted into the base platform by the securing mechanism;

the at least one button extension being integrated into the lateral frame;

the kickstand being hingedly connected to the distal face;

the at least one recessed space traversing into the base platform from the proximal face;

the at least one cooling module being situated within the at least one recessed space;

the plurality of structural ribs being arranged in a square-shaped grid pattern;

the plurality of structural ribs being integrated into the proximal face; and the plurality of structural ribs being distributed around the at least one recessed space.

14. The protective and cooling case for an electronic device as claimed in claim 13 comprising:
    at least one port-access opening; and
    the at least one port-access opening traversing through the lateral frame.

15. The protective and cooling case for an electronic device as claimed in claim 13 comprising:
    at least one camera opening; and
    the at least one camera opening traversing through the base platform.

16. The protective and cooling case for an electronic device as claimed in claim 13, wherein the at least one cooling module is a cooling pack.

17. The protective and cooling case for an electronic device as claimed in claim 13, wherein the at least one cooling module is a heatsink device.

18. The protective and cooling case for an electronic device as claimed in claim 17 comprising:
    the at least one cooling module comprising a thermally-conductive housing, a plurality of heat-retaining pipes, and a plug;
    the plurality of heat-retaining pipes being positioned within and throughout the thermally-conductive housing;
    the plug being releasably mounted into the thermally-conductive housing; and
    the plug being in fluid communication with the plurality of heat-retaining pipes.

* * * * *